(12) United States Patent
Meyers et al.

(10) Patent No.: US 6,486,889 B1
(45) Date of Patent: Nov. 26, 2002

(54) METHODS AND APPARATUS FOR TRANSFORMING RGB VIDEO

(75) Inventors: Michael Edward Meyers, Fairport, NY (US); Whynn Victor Lovette, Ontario, NY (US); John Stewart Ceci, Penfield, NY (US); Brian C. Hawkins, Rochester, NY (US)

(73) Assignee: Xerox Corporation, CT (US)

( * ) Notice: Subject to any disclaimer, the term of this patent is extended or adjusted under 35 U.S.C. 154(b) by 0 days.

(21) Appl. No.: 09/466,182

(22) Filed: Dec. 17, 1999

(51) Int. Cl.[7] .................................................. G09G 5/04
(52) U.S. Cl. ........................................................ 345/604
(58) Field of Search .................................. 345/602, 604

(56) References Cited

U.S. PATENT DOCUMENTS

| | | | |
|---|---|---|---|
| 5,455,626 A | * 10/1995 | Xu et al. | 348/385 |
| 5,504,821 A | * 4/1996 | Kanamori et al. | 382/167 |
| 5,519,441 A | 5/1996 | Gusmano et al. | |
| 6,340,975 B2 | * 1/2002 | Marsden et al. | 345/590 |
| 6,256,350 B1 | * 7/2002 | Bishay et al. | 375/240.21 |

OTHER PUBLICATIONS

Michael Stokes et al.,"A Standard Default Color Space for the Internet—sRGB," Version 1.10, Nov. 5, 1996: http://www.w3.org/Graphics/Color/sRGB.

Eric Hamilton, "JPEG File Interchange Format," Version 1.02, Sep. 1, 1992: http://www.w3.org/Graphics/JPEG/jfif.txt.

* cited by examiner

Primary Examiner—Jeffery Brier
Assistant Examiner—G. F. Cunningham
(74) Attorney, Agent, or Firm—Oliff & Berridge PLC

(57) ABSTRACT

Apparatus and methods in accordance with an exemplary embodiment of the invention convert RGB video to at least one video output of Lab video, YCbCr video, with or without gamma correction, and Srgb video, with or without gamma correction. This conversion increases the flexibility of image information communication by enabling RGB video to be provided to a device that can only handle one of Lab, Srgb and/or YCbCr video.

26 Claims, 1 Drawing Sheet

METHODS AND APPARATUS FOR TRANSFORMING RGB VIDEO

BACKGROUND OF THE INVENTION

1. Field of Invention

The invention relates to color space transformation of RGB video.

2. Description of Related Art

Data relating to color information, such as color images, can be communicated to a broad range of devices, such as, for example, cathode ray tube monitors, televisions, scanners, digital cameras and printers. However, these devices typically utilize numerous different formats and methods of handling the color information. Thus, color information communicated to a certain device may not be in the appropriate format to be utilized by that device. Communicating improperly formatted color information may result in the device incorrectly mapping the color information or even the device being unable to utilize the color information at all.

SUMMARY OF THE INVENTION

It is therefore desirable to enable a device, that is only able to handle a specified format of color information, to handle another format of color information that is at least initially different from the specified format. In other words, it is desirable to enable the communication of a first format of color information to a device that is only able to handle a second and different format of color information.

For example, a common format of color information is RGB video. It is therefore desirable to provide methods and apparatus for converting the RGB video into other formats, such as, for example, Lab video, YCbCr video, with or without gamma correction, and/or Srgb video (scanner independent RGB) with or without gamma correction. The apparatus and methods of the invention can use look-up tables to hold data for a non-linear portion of the Lab conversion process and/or to hold data for gamma correction curves.

The invention therefore provides the advantage of increasing the flexibility of image information communication by enabling devices to handle image information that had not been initially formatted to be compatible with the devices. The invention thereby increases the amount of image information that can be handled by various devices.

These and other features and advantages of this invention are described in or are apparent from the following detailed description of various exemplary embodiments of the systems and methods according to this invention.

BRIEF DESCRIPTION OF THE DRAWINGS

Various exemplary embodiments of systems and methods according to this invention will be described in detail, with reference to the following figure, wherein.

DETAILED DESCRIPTION OF PREFERRED EMBODIMENTS

Figure 1:
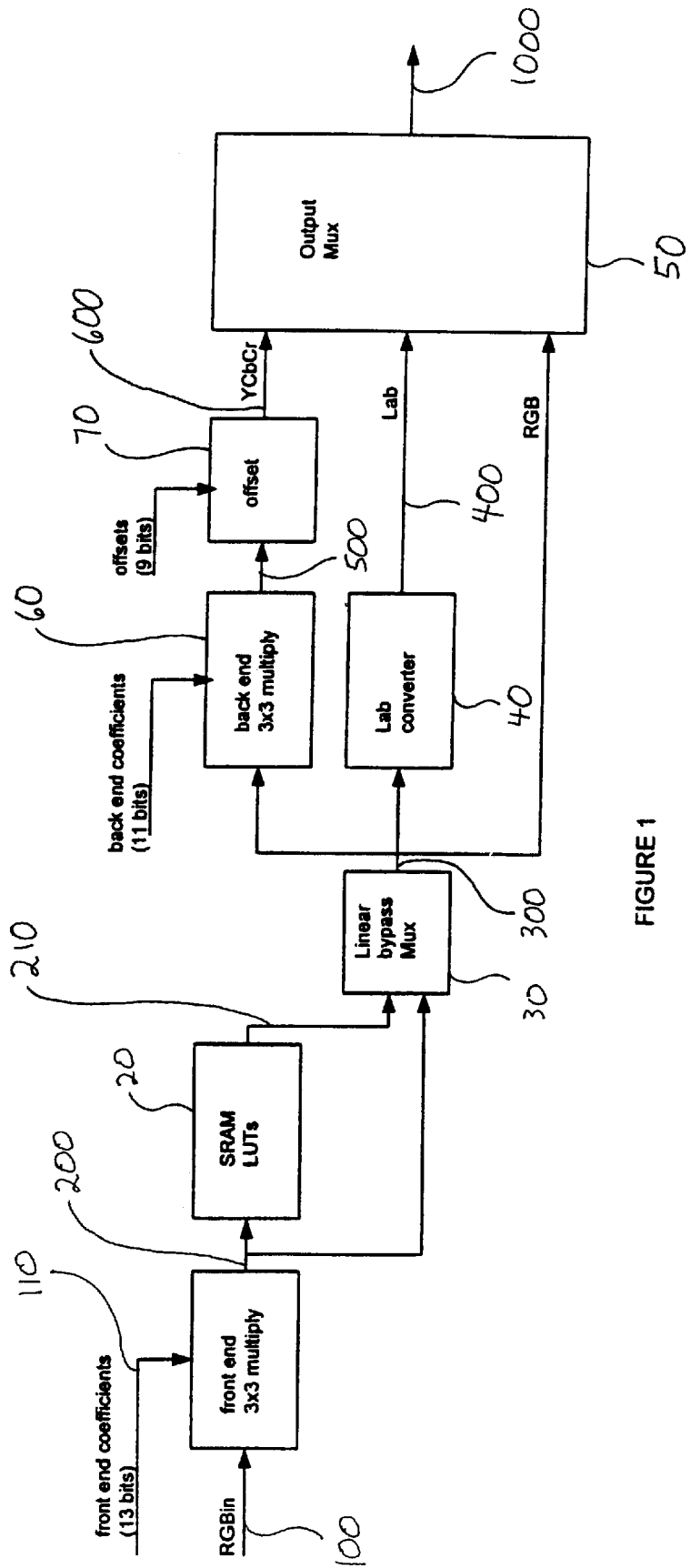
FIG. 1 is a block diagram of a method and apparatus for transforming RGB video in accordance with an exemplary embodiment of the invention.

FIG. 1 is a block diagram that shows a method and apparatus for transforming RGB video in accordance with an exemplary embodiment of the invention. As shown in FIG. 1, an input 100 of RGB video is converted to at least one video output 1000 of at least one of Lab video, YCbCr video, with or without gamma correction, and Srgb video (scanner independent RGB), with or without gamma correction, by the exemplary embodiment of the methods and apparatus of the invention. This exemplary conversion is discussed in detail below.

The input 100, which includes three channels of 9 bit RGB video, is provided to a front end 3×3 multiplier 10. Thirteen bit front end coefficients, which can be programmable, are also provided to the multiplier 10. The multiplier 10 then performs a matrix multiply using the input 100 and the front end coefficients.

The multiply performed by the multiplier 10 can be expressed as follows:

$$X = (fe\_coefficient\ 0)R + (fe\_coefficient\ 1)G + (fe\_coefficient\ 2)B;$$

$$Y = (fe\_coefficient\ 3)R + (fe\_coefficient\ 4)G + (fe\_coefficient\ 5)B;$$

and $$Z = (fe\_coefficient\ 6)R + (fe\_coefficient\ 7)G + (fe\_coefficient\ 8)B;$$

wherein: fe_coefficients (0–8) are the programmable front end coefficients, RGB are three input video components of the input 10, and XYZ are three outputs of the multiplier 10.

The outputs 200 of the front end 3×3 multiplier 10 will, under normal circumstances, represent one of two possible cases. If the RGB input 100 is being converted to Lab, the outputs 200 will represent the tristimulus values X, Y and Z, assuming the coefficients have been programmed properly. Alternatively, if the RGB input 100 is being converted to at least one of Srgb and YCbCr, a different set of coefficients will have been loaded, and the outputs 200 will represent Srgb, i.e., device independent RGB.

If the RGB input 100 is being converted to Lab, then the outputs 200 of the multiplier 10 are provided to SRAM look-up tables 20. In such a situation, the tables can contain data necessary for the Lab conversion.

If the RGB input 100 is being converted to either YCbCr of Srgb with gamma correction, or any other type of correction involving non-linear transformation of the video data, then the outputs 200 of the multiplier 10 are also provided to the SRAM look-up tables 20. In such a situation, the tables can contain data necessary for such a non-linear transformation.

The SRAM look-up tables 20 can be located external to any device implementing the invention. Alternatively, the SRAM look-up tables 20 can be incorporated into, and disposed internally relative to, the device.

The invention can use a bit from a mode control register (not shown) to select which sections of the tables are to be used. This procedure would allow the tables to be loaded once, such as at power up, and still allow the data to be changed easily via software, as opposed to PROM based look-up tables.

If the RGB input 100 is being converted to either YCbCr or Srgb without gamma correction, or any other type of correction involving non-linear transformation of the video data, then the outputs 200 of the multiplier 10 are provided directly to a linear bypass circuit 30. The outputs 210 of the SRAM look-up tables 20 are also provided to the linear bypass circuit 30. The linear bypass circuit 30 obviates reloading the tables with 1:1 data for no gamma correction or other non-linear transformation.

If the RGB input 100 is being converted to Lab, then the outputs of the SRAM look-up tables are provided, via the linear bypass circuit 30, to a hard coded Lab converter circuit 40. The Lab converter circuit 40 can implement the following:

$$L = 296 f(Y) - 41;$$

$$a = 500 [f(X) - f(Y)] + 128;$$

and $$b = 200 [f(Y) - F(Z)] + 128;$$

where X, Y and Z are the inputs to the SRAM look-up tables 20, and the data in the tables represents a function f which is defined as:

| $f(t) = t^{1/3}$ | $1 \geq t > 0.008856$ |
|---|---|
| $= 7.787t + (16/116)$ | $0 \leq t \leq 0.008856.$ |

The output 400 of the Lab converter circuit 40 is then provided to an output circuit 50. The output circuit 50 provides the Lab video output 1000.

If the RGB input 100 is being converted to Srgb, with or without gamma correction or any other type of non-linear transformation, then the output 300 of the linear bypass circuit 30 is provided directly to the output circuit 50, which then provides the Srgb video output 1000. No further operations are required for the conversion since, as discussed above, the front end 3×3 multiplier 10 can be programmed with coefficients to output Srgb.

Thus, if the RGB input 100 is being converted to Srgb without gamma correction, or any other type of correction involving non-linear transformation of the video data, then the outputs 200 of the multiplier 10 are provided to the output circuit 50 via the linear bypass circuit 30. Alternatively, if the RGB input 100 is being converted to Srgb with gamma correction, or some other type of correction involving non-linear transformation of the video data, then the outputs 200 of the multiplier 10 are provided to the SRAM look-up tables 20, and the outputs 210 of the SRAM look-up tables 20 are provided to the output circuit 50 via the linear bypass circuit 30.

If the RGB input 100 is being converted to YCbCr, with or without gamma correction or any other type of non-linear transformation, then the output 300 of the linear bypass circuit 30 is provided to a back end 3×3 multiplier 60. The output 500 of the back end 3×3 multiplier 60 is then provided to an offset circuit 70.

Eleven bit back end coefficients are provided to the back end 3×3 multiplier 60, and 9 bit offsets are provided to the offset circuit 70. The back end 3×3 multiplier 60 and the offset circuit 70 can perform the following:

$$Y = (be\_coefficient\ 0)R + (be\_coefficient\ 1)G + (be\_coefficient\ 2)B + offset\_Y;$$

$$Cb = (be\_coefficient\ 3)R + (be\_coefficient\ 4)G + (be\_coefficient\ 5)B + offset\_Cb;$$

and $$Cr = (be\_coefficient\ 6)R + (be\_coefficient\ 7)G + (be\_coefficient\ 8)B + offset\_Cr;$$

wherein: be_coefficients (0–8) are the programmable back end coefficients, and Y, Cb and Cr are the outputs.

The output 600 of the offset circuit 70 is then provided to the output circuit 50. The output circuit 50 provides the YCbCr video output 1000.

As discussed above, a programmable mode register (not shown) can be provided to determine the color space to which the RGB input 100 is to be converted. In other words, the output circuit 50 outputs at least one of Lab, Srgb and YCbCr based on the setting of the programmable mode register.

The exemplary embodiment discussed above increases the flexibility of image information communication by converting an RGB input 100 into at least one of Lab, Srgb and YCbCr video. This conversion enables RGB video information to be provided to a device that can only handle one of Lab, Srgb and/or YCbCr video.

The exemplary embodiments of the apparatus and methods are described above relative to converting RGB video to at least one of Lab, Srgb and YCbCr video. However, the invention is not intended to be limited to these examples. Instead, the invention is intended to cover conversions of video formats other than those discussed above. For example, the invention can cover conversions of information not relating to color imaging. In fact, the invention can cover conversions of information not relating to imaging or image information.

The various devices described above can be implemented using a programmed general purpose computer. However, the various devices described above can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the operations discussed above, can be used to implement the various operations described above.

Communication links connecting the various devices can be any known or later developed device or system for connecting the devices, including a direct cable connection, a connection over a wide area network or a local area network, a connection over an intranet, a connection over the Internet, or a connection over any other distributed processing network or system. In general, the communication links can be any known or later developed connection system or structure usable to connect the devices.

While the systems and methods of this invention have been described in conjunction with the specific embodiments outlined above, it is evident that many alternatives, modifications and variations will be apparent to those skilled in the art. Accordingly, the exemplary embodiments of the systems and methods of this invention, as set forth above, are intended to be illustrative, not limiting. Various changes may be made without departing from the spirit and scope of the invention.

What is claimed is:

1. A method of converting RGB video, comprising:
    inputting the RGB video into a converter, the converter having a plurality of modes;
    setting the converter to at least one of the plurality modes which allows the converter to convert the RGB video to at least one of Lab, Srgb and YCbCr;
    converting the RGB video with the converter to the at least one of Lab, Srgb and YcbCr, wherein
    the inputting step includes inputting 9 bit RGB video and 13 bit front end coefficients into a front end 3×3 multiplier, and the converting step includes performing a matrix multiply as follows:

$X = (\text{fe\_coefficient } 0)R + (\text{fe\_coefficient } 1)G + (\text{fe\_coefficient } 2)B;$ $Y = (\text{fe\_coefficient } 3)R + (\text{fe\_coefficient } 4)G + (\text{fe\_coefficient } 5)B;$ and $Z = (\text{fe\_coefficient } 6)R + (\text{fe\_coefficient } 7)G + (\text{fe\_coefficient } 8)B;$ wherein: fe_coefficients (0–8) are the front end coefficients, RGB are three input video components of the 9 bit RGB video input, and XYZ are three outputs of the front end 3×3 multiplier.

2. The method according to claim 1, wherein the converting step includes performing the matrix multiply so that the front end 3×3 multiplier outputs Srgb video.

3. The method according to claim 2, wherein the converting step includes providing the Srgb output from the front end 3×3 multiplier to an output circuit via a linear bypass circuit, and outputting Srgb video with the output circuit.

4. The method according to claim 2, wherein the converting step includes providing the Srgb output from the front end 3×3 multiplier to at least one SRAM look-up table, and performing a non-linear transformation of the Srgb output from the front end 3×3 multiplier with the at least one SRAM look-up table.

5. The method according to claim 4, therein the converting step includes performing gamma correction of the Srgb output from the front end 3×3 multiplier with the at least one SRAM look-up table, and outputting the Srgb with gamma correction.

6. The method according to claim 5, wherein the converting step includes providing the Srgb with gamma correction outputted from the at least one SRAM look-up table to an output circuit via a linear bypass circuit, and outputting Srgb video with gamma correction with the output circuit.

7. The method according to claim 2, wherein the converting step includes providing the Srgb video outputted from the front end 3×3 multiplier to a back end 3×3 multiplier via a linear bypass circuit, inputting 11 bit back end coefficients to the back end 3×3 multiplier, and providing an output from the back end 3×3 multiplier to an offset circuit so as to perform the following:

$Y = (\text{be\_coefficient } 0)R + (\text{be\_coefficient } 1)G + (\text{be\_coefficient } 2)B + \text{offset\_}Y;$ $Cb = (\text{be\_coefficient } 3)R + (\text{be\_coefficient } 4)G + (\text{be\_coefficient } 5)B + \text{offset\_}Cb;$ and $Cr = (\text{be\_coefficient } 6)R + (\text{be\_coefficient } 7)G + (\text{be\_coefficient } 8)B + \text{offset\_}Cr;$ wherein: be_coefficients (0–8) are the back end coefficients, and Y, Cb and Cr are outputs of the offset circuit.

8. The method according to claim 7, wherein the converting step includes providing the outputs of the offset circuit to an output circuit, and outputting YCbCr video with the output circuit.

9. The method according to claim 5, wherein the converting step includes providing the Srgb with gamma correction outputted from the at least one SRAM look-up table to a back end 3×3 multiplier via a linear bypass circuit, inputting 11 bit back end coefficients to the back end 3×3 multiplier, and providing an output from the back end 3×3 multiplier to an offset circuit so as to perform the following:

$Y = (\text{be\_coefficient } 0)R + (\text{be\_coefficient } 1)G + (\text{be\_coefficient } 2)B + \text{offset\_}Y;$ $Cb = (\text{be\_coefficient } 3)R + (\text{be\_coefficient } 4)G + (\text{be\_coefficient } 5)B + \text{offset\_}Cb;$ and $Cr = (\text{be\_coefficient } 6)R + (\text{be\_coefficient } 7)G + (\text{be\_coefficient } 8)B + \text{offset\_}Cr;$ wherein: be_coefficients (0–8) are the back end coefficients, and Y, Cb and Cr are outputs of the offset circuit.

10. The method according to claim 9, wherein the converting step includes providing the outputs of the offset circuit to an output circuit, and outputting YCbCr video with gamma correction with the output circuit.

11. The method according to claim 2, wherein the converting step includes providing the Srgb output from the front end 3×3 multiplier to at least one SRAM look-up table provided with data necessary for Lab conversion, and outputting a resultant from the at least one SRAM look-up table.

12. The method according to claim 11, wherein the converting step includes providing the resultant outputted from the at least one SRAM look-up table to a hard coded Lab converter circuit, and implementing the following:

$L = 296 f(Y) - 41;$ $a = 500[f(X) - f(Y)] + 128;$ and $b = 200[f(Y) - f(Z)] + 128;$ wherein: X, Y and Z are components of the Srgb video, and data in the tables represents a function f which is defined as:

| f(t) | = $t^{1/3}$ | $1 \geq t > 0.008856$ |
|---|---|---|
| | = $7.787 t + (16/116)$ | $0 \leq t < 0.008856.$ |

13. The method according to claim 12, wherein the converting step includes providing an output of the hard coded Lab converter circuit to an output circuit, and outputting Lab video with the output circuit.

14. An apparatus for converting RGB video, comprising:
a converter that converts a 9 bit RGB video into at least one of Lab, Srgb and YCbCr, the converter having a plurality of modes;
a setting device that sets the converter to at least one of the plurality of modes which allows the converter to convert the RGB video to the at least one of Lab, Srgb and YcbCr; and
a front end 3×3 multiplier that, upon receiving 13 bit front end coefficients, performs a matrix multiply as follows:

$X = (\text{fe\_coefficient } 0)R + (\text{fe\_coefficient } 1)G + (\text{fe\_coefficient } 2)B;$ $Y = (\text{fe\_coefficient } 3)R + (\text{fe\_coefficient } 4)G + (\text{fe\_coefficient } 5)B;$ and $Z = (\text{fe\_coefficient } 6)R + (\text{fe\_coefficient } 7)G + (\text{fe\_coefficient } 8)B;$ wherein: fe_coefficients (0–8) are the front end coefficients, RGB are three input video components of the 9 bit RGB video input, and XYZ are three outputs of the front and 3×3 multiplier.

15. The apparatus according to claim 14, wherein the front end 3×3 multiplier outputs Srgb video.

16. The apparatus according to claim 15, further including an output circuit that, upon receiving Srgb video outputted from the front end 3×3 multiplier, outputs Srgb video.

17. The apparatus according to claim 15, further including at least one SRAM look-up table that performs a non-linear transformation of the Srgb video output from the front end 3×3 multiplier.

18. The apparatus according to claim 17, wherein the at least one look-up table performs gamma correction of the Srgb output from the front end 3×3 multiplier.

19. The apparatus according to claim 18, further including an output circuit that, upon receiving Srgb with gamma correction from the at least one SRAM look-up table, outputs Srgb video.

20. The apparatus according to claim 17, further including a back end 3×3 multiplier that receives the Srgb video outputted from the front end 3×3 multiplier and 11 bit back end coefficients, and an offset circuit that receives an output from the back end 3×3 multiplier, the back end 3×3 multiplier and offset circuit performing the following:

$$Y = (be\_coefficient\ 0)R + (be\_coefficient\ 1)G + (be\_coefficient\ 2)B + offset\_Y;$$

$$Cb = (be\_coefficient\ 3)R + (be\_coefficient\ 4)G + (be\_coefficient\ 5)B + offset\_Cb;$$

and $$Cr = (be\_coefficient\ 6)R + (be\_coefficient\ 7)G + (be\_coefficient\ 8)B + offset\_Cr;$$

wherein: be_coefficients (0–8) are the back end coefficients, and Y, Cb and Cr are outputs of the offset circuit.

21. The apparatus according to claim 20, further including an output circuit that, upon receiving the outputs of the offset circuit, outputs YCbCr video.

22. The apparatus according to claim 15, further including at least one SRAM look-up table that is provided with data necessary for Lab conversion, and outputs a resultant.

23. The apparatus according to claim 22, further including a hard coded Lab converter circuit that, upon receiving the resultant outputted from the at least one SRAM look-up table, implements the following:

$$L = 296f(Y) - 41;$$

$$a = 500[f(X) - f(Y)] + 128;$$

and $$b = 200[f(Y) - f(Z)] + 128;$$

wherein: X, Y and Z are components of the Srgb video, and data in the tables represents a function f which is defined as:

| | | |
|---|---|---|
| $f(t) = t^{1/3}$ | | $1 \geq t > 0.008856$ |
| $= 7.787t + (16/116)$ | | $0 \leq t < 0.008856.$ |

24. The apparatus according to claim 23, further including an output circuit that, upon receiving an output of the hard coded Lab converter circuit, outputs Lab video.

25. A method of converting RGB video, comprising:

inputting the RGB video into a converter;

converting the RGB video with the converter to the at least one of Lab, Srgb and YCbCr, wherein the inputting step includes inputting 9 bit RGB video and 13 bit front end coefficients into a front end 3×3 multiplier.

26. An apparatus for converting RGB video, comprising:

a converter that converts a 9 bit RGB video into at least one of Lab, Srgb and YCbCr; and a front end 3×3 multiplier that receives input in the form of the 9 bit RGB video and 13 bit front end coefficients.

* * * * *